United States Patent
Bharti et al.

(10) Patent No.: US 10,623,815 B2
(45) Date of Patent: Apr. 14, 2020

(54) MASKING SCREEN RESPONSIVE TO VIEWPOINT

(71) Applicant: INTERNATIONAL BUSINESS MACHINES CORPORATION, Armonk, NY (US)

(72) Inventors: Harish Bharti, Pune (IN); Abhay K. Patra, Pune (IN); Sreenath Raghunath, Pune (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 15/722,461

(22) Filed: Oct. 2, 2017

(65) Prior Publication Data

US 2019/0104329 A1    Apr. 4, 2019

(51) Int. Cl.
*H04N 21/454* (2011.01)
*H04N 21/2343* (2011.01)
*H04N 21/442* (2011.01)
*H04N 21/475* (2011.01)
*H04N 21/81* (2011.01)
(Continued)

(52) U.S. Cl.
CPC ..... *H04N 21/4542* (2013.01); *G01N 29/0663* (2013.01); *H04N 21/23439* (2013.01); *H04N 21/44218* (2013.01); *H04N 21/816* (2013.01); *H04N 21/4755* (2013.01); *H04N 2013/403* (2018.05)

(58) Field of Classification Search
CPC .................................................. H04N 21/4542
USPC ......................................................... 725/25
See application file for complete search history.

(56) References Cited

U.S. PATENT DOCUMENTS

| 5,912,721 A | 6/1999 | Yamaguchi et al. |
| 8,462,949 B2 | 6/2013 | Anderson et al. |
(Continued)

FOREIGN PATENT DOCUMENTS

EP    2725814 A1 *    4/2014    ......... H04N 21/4223

OTHER PUBLICATIONS

Peter Mell et al, The NIST Definition of Cloud Computing, National Institute of Standards and Technology, Publication 800-145, 2011, entire document.

(Continued)

*Primary Examiner* — Tyler W. Sullivan
(74) *Attorney, Agent, or Firm* — Patrick J. Daugherty; Daugherty & Del Zopp Co., LPA

(57) ABSTRACT

Aspects determine horizontal viewing angles for viewers of a display screen as a function of outer edge visual boundary lines projecting from outer edges of the display screen to different respective viewing locations of the viewers. The aspects determine locations of intersections of outer edge visual boundary lines defining the horizontal viewing angle of a first viewer with the outer edge visual boundary lines defining the horizontal viewing angles of the other viewers, and thereby a masking screen width dimension and spatial location for the first viewer as extending from an intersection location determined on one of the outer edge visual boundary lines defining the first viewer's viewing angle that is closest to the first viewer, to a point on another outer edge visual boundary line defining the first viewer's viewing angle that is outside of the viewing angles of the other viewers.

20 Claims, 6 Drawing Sheets

(51) Int. Cl.
*G01N 29/06* (2006.01)
*H04N 13/30* (2018.01)

(56) References Cited

U.S. PATENT DOCUMENTS

| | | | | |
|---|---|---|---|---|
| 8,687,054 | B1 | 4/2014 | Elwell et al. | |
| 8,922,480 | B1 | 12/2014 | Freed et al. | |
| 2002/0163482 | A1* | 11/2002 | Sullivan | G02B 27/2278 345/6 |
| 2009/0183080 | A1* | 7/2009 | Thakkar | G06F 16/4393 715/733 |
| 2011/0032274 | A1* | 2/2011 | Miyata | G06F 3/011 345/660 |
| 2011/0036169 | A1 | 2/2011 | Shekhawat et al. | |
| 2011/0179436 | A1 | 7/2011 | Candelore | |
| 2011/0216061 | A1* | 9/2011 | De La Barre | G06T 15/00 345/419 |
| 2012/0167123 | A1* | 6/2012 | Gavita | H04N 21/4223 725/10 |
| 2012/0210342 | A1* | 8/2012 | Gonzalez | H04N 21/4532 725/25 |
| 2013/0169765 | A1* | 7/2013 | Park | H04N 7/142 348/54 |
| 2013/0207887 | A1 | 8/2013 | Raffle et al. | |
| 2014/0232837 | A1* | 8/2014 | Kim | H04N 13/31 348/59 |
| 2014/0320755 | A1 | 10/2014 | Martinez et al. | |
| 2016/0080510 | A1* | 3/2016 | Dawoud Shenouda Dawoud | H04L 47/808 709/225 |
| 2018/0176535 | A1* | 6/2018 | Ninan | G06F 3/013 |
| 2018/0249213 | A1* | 8/2018 | Bostick | H04N 21/4542 |
| 2019/0250999 | A1* | 8/2019 | Miance | G06F 11/1469 |

OTHER PUBLICATIONS

Samsung, Samsung files patent for smartphone that can display holographic images, hffp://www.androidauthority.com/samsung-patent-smartphone-holographic-images-633167, 2015, pp. 1-4.
Pranav Fruitwala et al, Proposed System for Mid-Air Holography Projection Using Conversion of 2D to 3D Visualization, International Journal of Advanced Researh in Engineering and Technology (IJARET), http://www.iaeme.com/IJARET/issues.asp, 2016, pp. 159-167.
Kaushik Patowary, Aerial 3D: Stunning 3D Holographic Projection in Mid-Air, http://www.instantfundas.com/2011/11/aerial-3d-stunning-3d-holographic.html, 2011, pp. 1-3.
Clay Dillow, 3D Projection Tech Makes Images Hover in Mid-Air, No Screen Necessary, http://www.popsci.com/technology/article/ 2011, DigInfo News, 2011, pp. 1-2.
Udacity.com, How does Google Glass project the image onto the glass?, https://www.quora.com/How-does-Google-Glass-project-the-image-onto-the-glass, 2015, pp. 1-9.
Jacob Kleinman, Google Glass with a Built-In Projector Gets Patented by Google, https://www.technobuffalo.com/2014/10/31/, 2014, pp. 1-2.

* cited by examiner

MASKING SCREEN RESPONSIVE TO VIEWPOINT

BACKGROUND

Multimedia presentations that present graphic imagery, sometimes accompanied by audio content, include movies, video, television shows, games, etc. Problems arise when such presentations include content that may not be suitable for all content consumers: for example, a movie viewed by a group of family members may include portions of adult-oriented or violent content that is inappropriate for children within the viewing audience.

In order to assist content consumers in selecting multimedia presentation content that is appropriate for young children, as well as mature viewers who wish to avoid adult-oriented or violent content, content rating systems have been created that are used to inform consumers of attributes of content of multimedia presentations. For example, the Motion Picture Association of America (MPAA) film rating system is used in the United States and its territories to rate a film's suitability for certain audiences based on its content, wherein the entirety of the content of a movie, game or other multimedia presentation is considered in assigning a rating that is selected from a scale of rating that include "G", "PG", "PG-13", "R" and "NC-17."

The MPAA "G" rating denotes that an entirety of the content of a movie, game or other multimedia presentation is suitable for "General Audiences," inclusive of children, wherein no portions of the content are deemed as likely to offend parents for viewing by children. The "PG" or "Parental Guidance Suggested" indicates that some material may not be suitable for children, wherein parents urged to give "parental guidance" to any children who may view or otherwise consume this content, in order to assuage any fears engendered by tense or threatening situations, etc. PG-rated multimedia presentations may contain some material parents might not like for their young children.

The "PG-13" or "Parents Strongly Cautioned" rating is intended to convey that some portions of material content may be inappropriate for children under the age of 13; parents are urged to be cautious, as some material may be inappropriate for pre-teenagers, regardless of "parental guidance." The "R" or "Restricted Under 17" rating requires an accompanying parent or adult guardian for the admission of children 17 or younger to a theatrical presentation in a commercial cinema, indicating that the multimedia presentation contains some adult material, and wherein parents are urged to learn more about the film before taking their young children with them. The "NC-17" or "Adults Only" rating conveys that no one 17 and under should view the multimedia content, wherein children are not admitted to commercial facilities presenting the content.

While such ratings are useful in selecting content appropriate for children, objectionable content may nonetheless occur within the safer, G and PG rated materials. For example, in one study the content of a set of 390 top-grossing movies released between 1985 and 2010 was analyzed for the presentation of sexual relations, violence, tobacco and alcohol use subject matter, wherein 90% of the movies within the set were determined to include at least one instance of a character engaging in "violence" (defined as intentional acts by an aggressor to make physical contact with another that has potential to inflict injury or harm, or is intended to cause harm, to coerce, or for fun). Thus, a movie that showed a character attempting to punch another character and missing would qualify as "violent," even if no other instances of violence were shown. Under this definition, 88.6% of G-rated or PG-rated movies were determined to contain "scenes of violence." Researchers within the study also coded films for their sexual content and portrayals of alcohol and tobacco use, in particular looking at the co-occurrence of such behaviors, and found that 77.4% of the set of movies that showed a main character committing an act of violence also included at least one other type of risky behavior with respect to sexual content portrayals and alcohol and tobacco use.

SUMMARY

In one aspect of the present invention, a computerized method for the generation of a masking screen with spatial location and size dimensions selected to avoid obstructing the viewpoint of other viewers includes executing steps on a computer processor. Thus, a computer processor is configured to determine horizontal viewing angles for each of a plurality of viewers of a display screen as a function of outer edge visual boundary lines projecting from left and right outer edges of the display screen to different respective viewing locations of the viewers. The configured processor determines locations of intersections of the outer edge visual boundary lines that define the horizontal viewing angle of a first viewer of the plurality of viewers with the outer edge visual boundary lines defining the horizontal viewing angles of others of the plurality of viewers, and thereby a masking screen width dimension and spatial location for the first viewer as a line that extends from a first of the determined intersection locations that is located on one of the outer edge visual boundary lines defining the viewing angle of the first viewer and is closest to the first viewer with respect to all others of the determined intersection locations, to a point on a remaining other of the outer edge visual boundary lines defining the viewing angle of the first viewer that is outside of the viewing angles of any remaining others of the plurality of viewers. In response to determining that a portion of a multimedia content displayed on the display screen to the plurality of viewers contains objectionable content relative to the first viewer, the configured processor projects a masking screen within the horizontal viewing angle of the protected viewer at the determined spatial location and having the determined width dimension for a duration of a presentment of the objectionable content portion of the multimedia content on the display screen, the projected masking screen thereby obscuring a view of the protected viewer of the objectionable content without obscuring views of remaining others of the plurality of viewers of the objectionable content.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine horizontal viewing angles for each of a plurality of viewers of a display screen as a function of outer edge visual boundary lines projecting from left and right outer edges of the display screen to different respective viewing locations of the viewers. The configured processor determines locations of intersections of the outer edge visual boundary lines that define the horizontal viewing angle of a first viewer of the plurality of viewers with the outer edge visual boundary lines defining the horizontal viewing angles of others of the plurality of viewers, and thereby a masking screen width dimension and spatial location for the first viewer as a line that extends from a first of the determined intersection locations that is located on one of the outer edge visual boundary lines defining the viewing angle of the first viewer and is closest to the first viewer with respect to all others of the determined intersection locations, to a point on a remaining other of the outer edge visual boundary lines defining the viewing angle of the first viewer that is outside of the viewing angles of any remaining others of the plurality of viewers. In response to determining that a portion of a multimedia content displayed on the display screen to the plurality of viewers contains objectionable content relative to the first viewer, the configured processor projects a masking screen within the horizontal viewing angle of the protected viewer at the determined spatial location and having the determined width dimension for a duration of a presentment of the objectionable content portion of the multimedia content on the display screen, the projected masking screen thereby obscuring a view of the protected viewer of the objectionable content without obscuring views of remaining others of the plurality of viewers of the objectionable content.

In another aspect, a computer program product for the generation of a masking screen with spatial location and size dimensions selected to avoid obstructing the viewpoint of other viewers has a computer-readable storage medium with computer readable program code embodied therewith. The computer readable hardware medium is not a transitory signal per se. The computer readable program code includes instructions for execution which cause the processor to determine horizontal viewing angles for each of a plurality of viewers of a display screen as a function of outer edge visual boundary lines projecting from left and right outer edges of the display screen to different respective viewing locations of the viewers. The configured processor determines locations of intersections of the outer edge visual boundary lines that define the horizontal viewing angle of a first viewer of the plurality of viewers with the outer edge visual boundary lines defining the horizontal viewing angles of others of the plurality of viewers, and thereby a masking screen width dimension and spatial location for the first viewer as a line that extends from a first of the determined intersection locations that is located on one of the outer edge visual boundary lines defining the viewing angle of the first viewer and is closest to the first viewer with respect to all others of the determined intersection locations, to a point on a remaining other of the outer edge visual boundary lines defining the viewing angle of the first viewer that is outside of the viewing angles of any remaining others of the plurality of viewers. In response to determining that a portion of a multimedia content displayed on the display screen to the plurality of viewers contains objectionable content relative to the first viewer, the configured processor projects a masking screen within the horizontal viewing angle of the protected viewer at the determined spatial location and having the determined width dimension for a duration of a presentment of the objectionable content portion of the multimedia content on the display screen, the projected masking screen thereby obscuring a view of the protected viewer of the objectionable content without obscuring views of remaining others of the plurality of viewers of the objectionable content.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
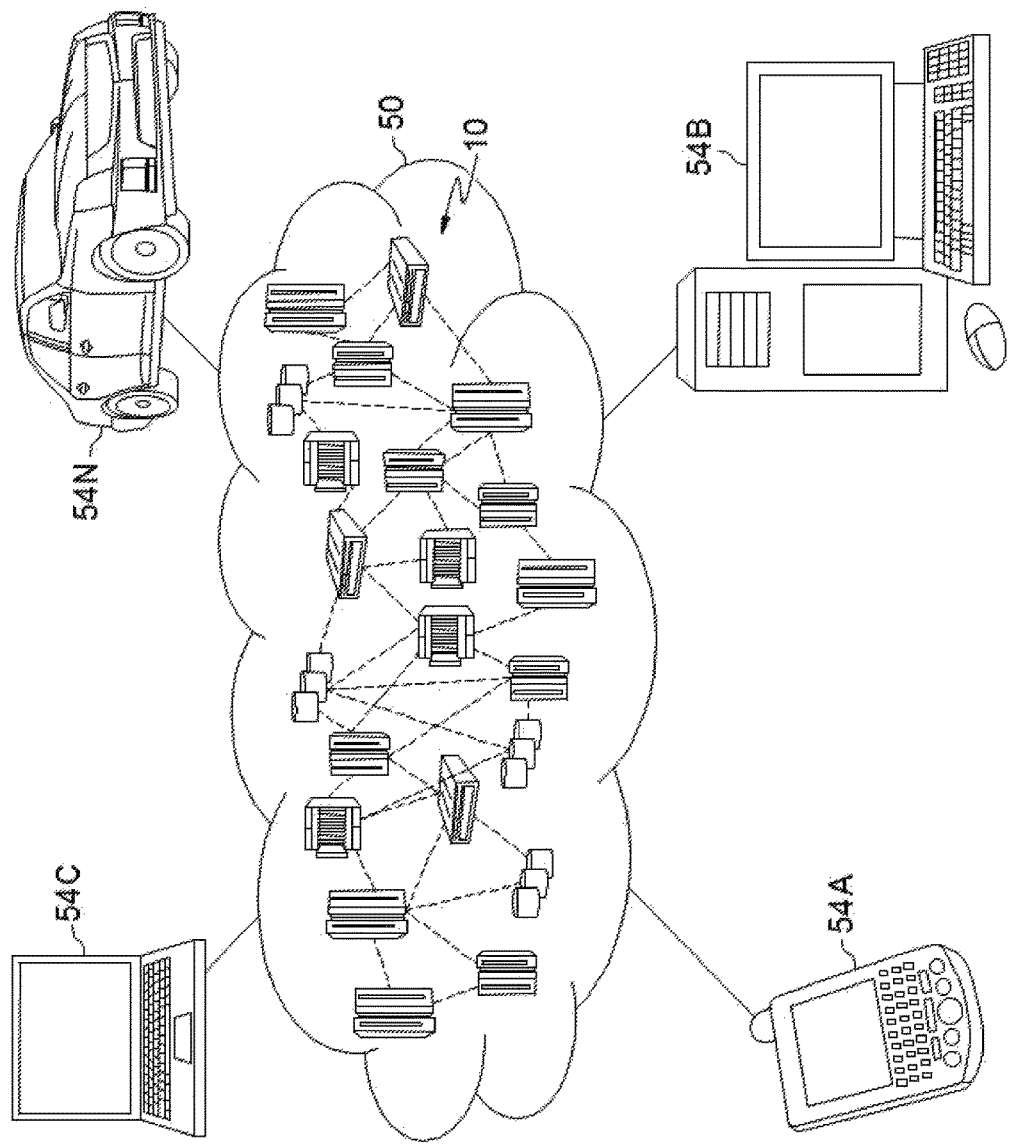
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
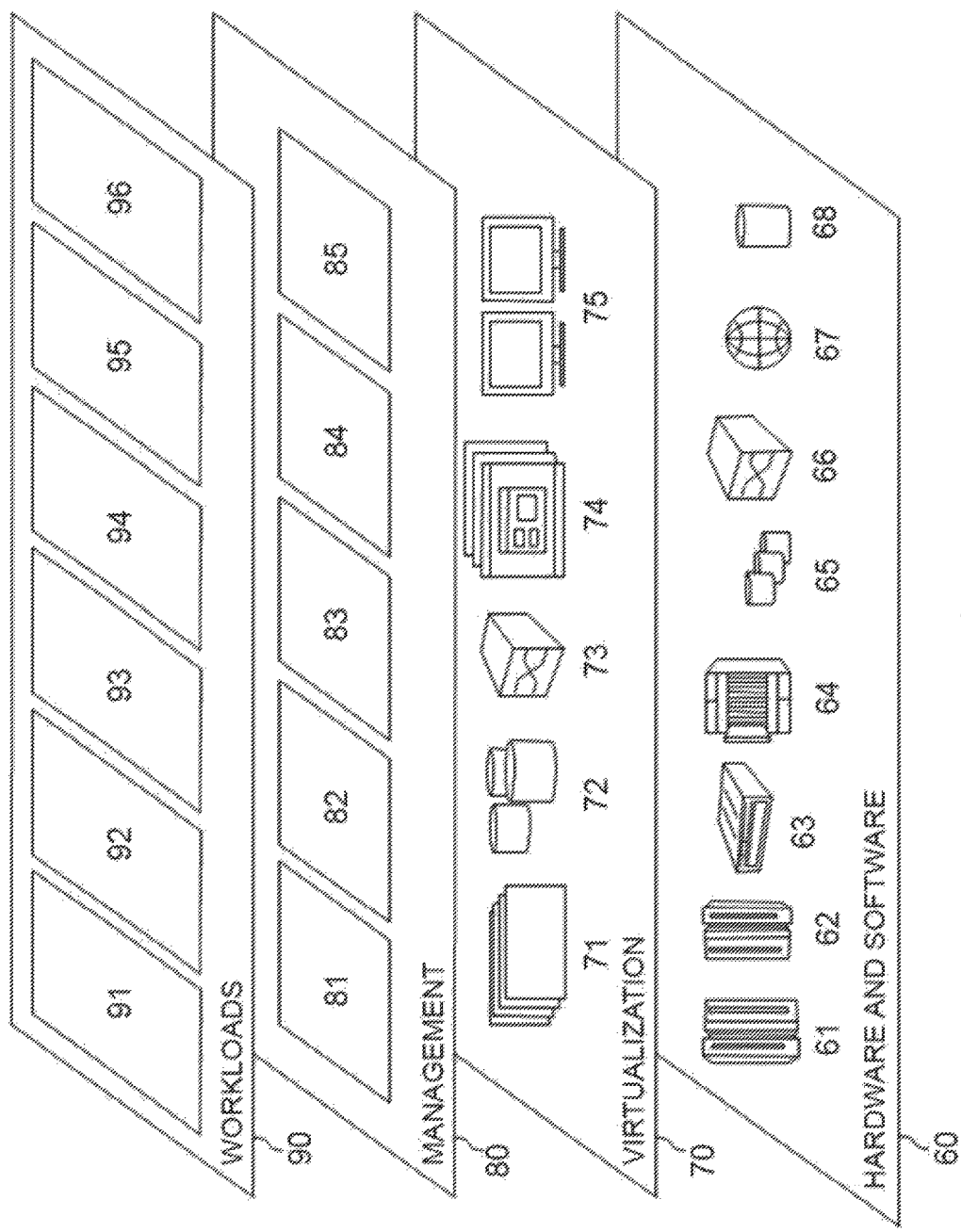
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for the generation of a masking screen with spatial location and size dimensions selected to avoid obstructing the viewpoint of other viewers 96.

Figure 3:
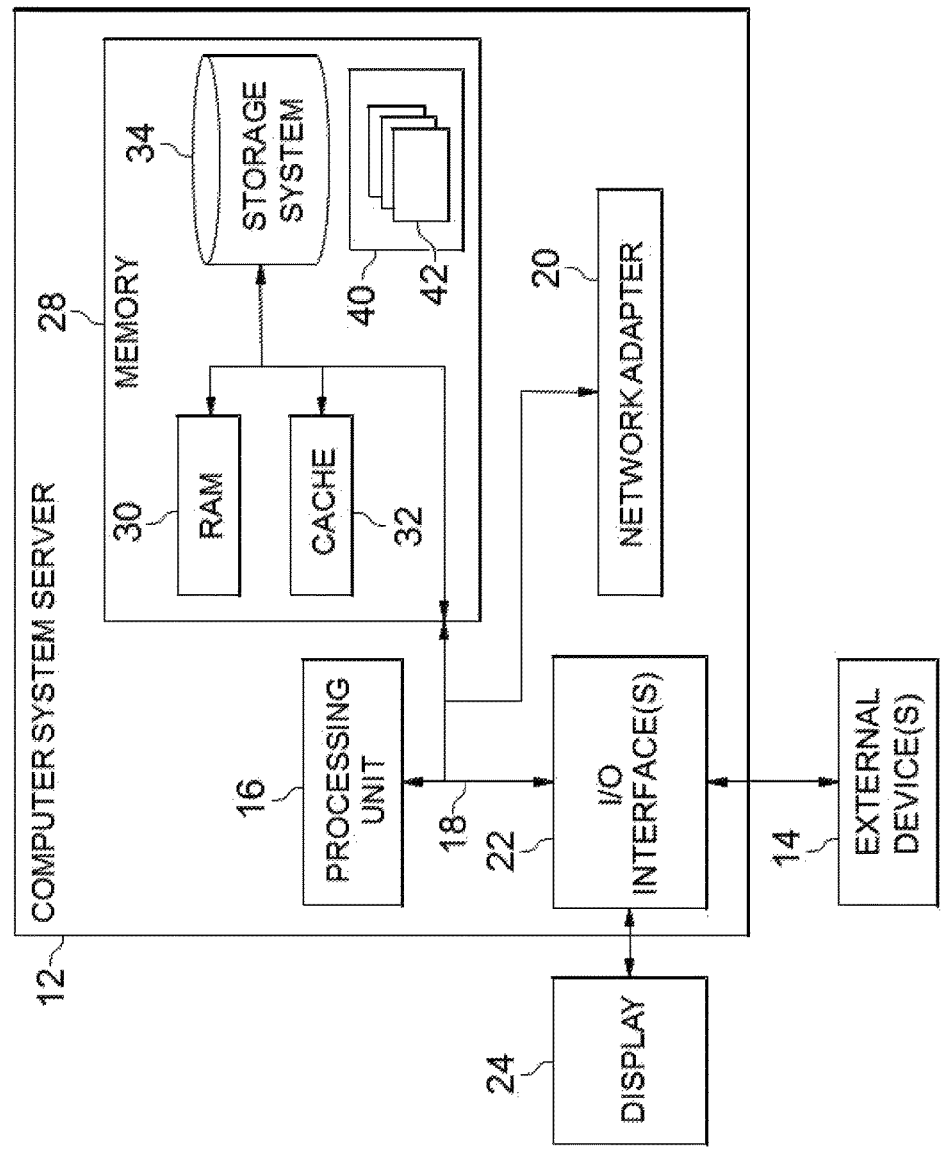
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that, although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
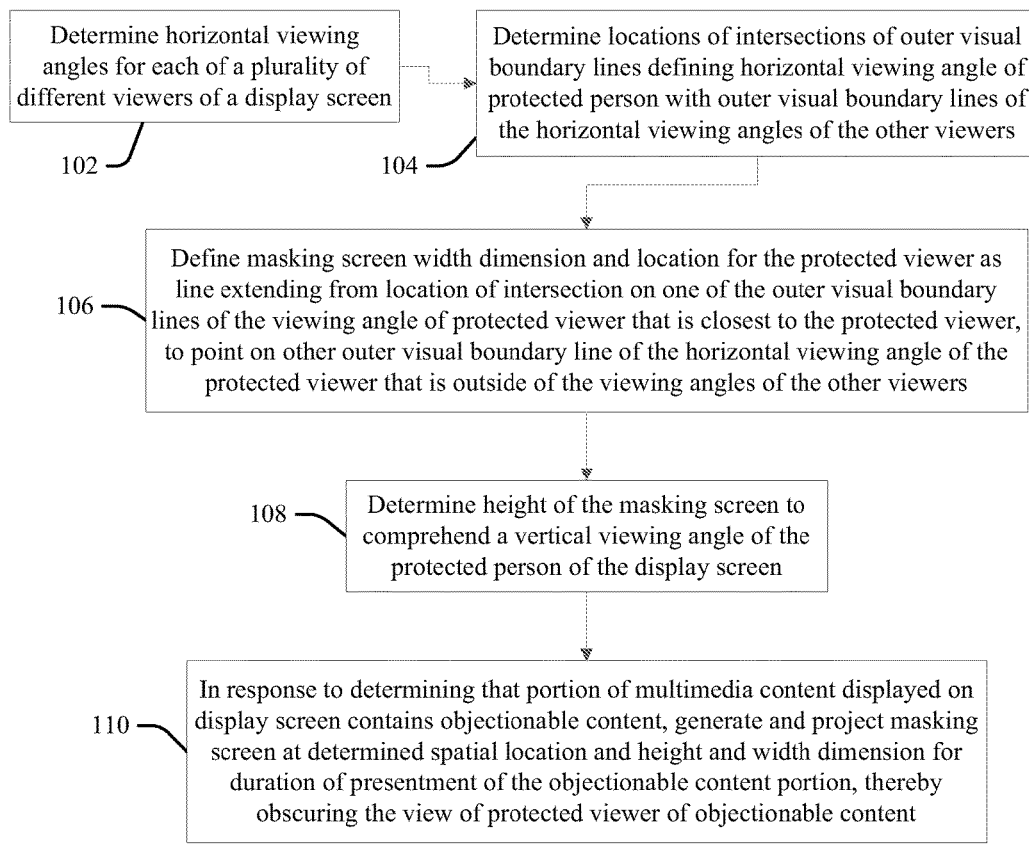
FIG. 4 is a flow chart illustration of an embodiment of the present invention.

FIG. 4 illustrates a process or system according to the present invention for the generation of a masking screen with spatial location and size dimensions selected to avoid obstructing the viewpoint of other viewers. At 102 a processor that is configured according to an aspect of the present invention (the "configured processor") determines (plots, identifies, etc.) horizontal viewing angles for each of a plurality of different viewers of a generally two-dimensional display screen, wherein the plurality of viewers includes a protected viewer, and the viewers are located at different viewing locations of the screen relative to each other along a lateral (horizontal) direction that is normal to a viewing distance dimension or direction from the display screen. The horizontal viewing angles of each viewer are defined (subtended) at 102 by pairs of straight outer edge visual boundary lines, each one projecting from the different corresponding lateral left and right outer edges or sides of the screen to the different respective lateral viewing locations of the viewers. The protected viewer is a child or other person that is designated for protection from exposure to objectionable portions (violent, adult-oriented content, etc.) of a multimedia presentation displayed on or otherwise conveyed to the viewers by the two-dimensional display screen.

At 104 the configured processor determines (plots, etc.) the locations of intersections of the outer visual boundary lines that define the horizontal viewing angle of the protected person with the outer visual boundary lines of the horizontal viewing angles of others of the plurality of viewers.

At 106 the configured processor defines (solves, identifies, etc.) a masking screen width dimension and location for the protected viewer as a line that extends from a location of a (first) intersection on one (a first) of visual boundary lines of the viewing angle of a protected viewer that is closest (nearest) to protected viewer along (with respect to) the viewing distance dimension from the display screen, to a point on the remaining other (second) outer visual boundary line of horizontal viewing angle of the protected viewer that is outside of (not encompassed within) the viewing angle of any others of the plurality of viewers.

At 108 the configured processor determines a height dimension of the masking screen to comprehend a vertical viewing angle of the protected person of the display screen. Generally, this viewing angle is defined (subtended) by pairs of straight upper and lower edge visual boundary lines or planes projecting from the different corresponding upper (top) and lower (bottom) outer edges or sides of the screen to the vertical viewing location of the protected viewer relative to the lateral location of the viewer (for example, distance of eyes of the protected viewer to the floor or seat bottom located at the lateral location used to define the horizontal viewing angle).

At 110, in response to determining that a portion of a multimedia content displayed on the display screen to the plurality of viewers contains objectionable content relative to the protected viewer (and therefore that the protected viewer should be prevented the objectionable content portion), the configured processor generates and projects a masking screen at the spatial location and having the determined height and width dimensions for a duration of presentment of the objectionable content portion of the multimedia content displayed on the display screen, within the horizontal and vertical viewing angle of the protected viewer, the projected masking screen thereby obscuring the view of the protected viewer of the objectionable content, without obscuring the views of remaining others of the plurality of viewers of the objectionable content.

Figure 5:
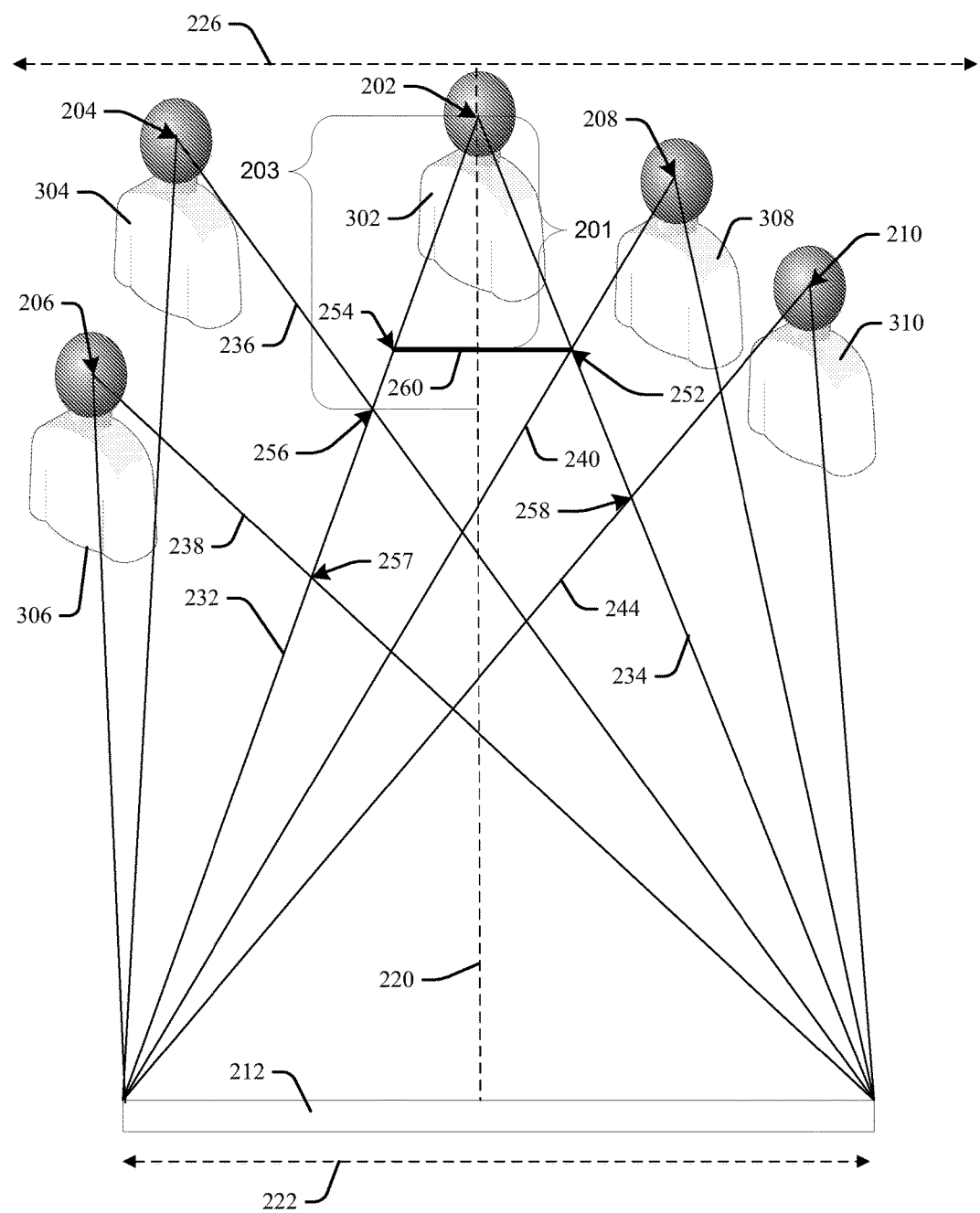
FIG. 5 is a block diagram illustration of an embodiment of the present invention.

FIG. 5 is a flow chart illustration of one embodiment of the present invention, wherein a processor configured according to the present invention (the "configured processor") determines (plots, identifies, etc.) horizontal viewing angles 202, 204, 206, 208 and 210 for each respective corresponding one (302, 304, 306, 308 or 310) of a plurality of different viewers of a generally two-dimensional display screen 212. The plurality of viewers includes a protected viewer 302, and each viewer 302, 304, 306, 308, and 310 is located at different viewing locations of the screen 212 relative to each other along a lateral (horizontal) direction 226 that corresponds to a two-dimensional orientation 222 of the display screen 212 (with respect to the display of multimedia content to the viewers on the display screen) and is normal to a viewing distance dimension or direction 220 from the display screen 212.

The configured processor determines that intersection 252 of outer boundary line 234 with the outer boundary line 240 of the horizontal angle of view 208 of another viewer 308 is the closest to the protected viewer 302, as a function of determining that it has a lowest distance dimension 201 relative to the viewing distance 220 from the screen 212 of all intersection locations determined (at 104, FIG. 4) on each of the outer visual boundary lines 232 and 234 that define the horizontal viewing angle 202 of the protected person 302 with the outer visual boundary lines of the horizontal viewing angles 204, 206, 208 and 210 of the other viewers 304, 306, 308 and 310. For example, intersection location 252 is closer to the protected viewer 302 along outer visual boundary line 234 relative to intersection point 258 with the outer boundary line 244 of the horizontal angle of view 210 of another viewer 310.

In the embodiment of FIG. 5, the configured processor defines (solves, identifies, etc.) the masking screen width dimension and location for a protected viewer 302 (at 106, FIG. 4) as a line 260 extending from intersection point 252 in a direction that is parallel to the two-dimensional display screen 212 to a point 254 on the other (second) outer visual boundary line 232 of horizontal viewing angle 202 of the protected viewer 302. This determination is conditional upon (is responsive to) determining that the point 254 is located within (and in this example, less than) a vertical distance 203 to the closest intersection to the protected viewer 302 along said second outer visual boundary line 232 (relative to the viewing distance dimension 220 from the display screen 212) on this boundary line with respect to any other intersection point determined or plotted thereon. In this example, the closest intersection is intersection 256 with the outer boundary line 236 of the horizontal angle of view 204 of another viewer 304 determined on the outer visual boundary line 232, which is closer than the next-closest, intersection 257 with the outer boundary line 238 of the horizontal angle of view 206 of another viewer 306. Thus, generating and projecting a masking screen having width dimension and location 260 for the protected viewer 302 ensures that such a masking screen is not within (that it is located outside of) the horizontal viewing angles 204, 206, 208 and 210 of each of the other viewers 304, 306, 308 and 310.

Figure 6:
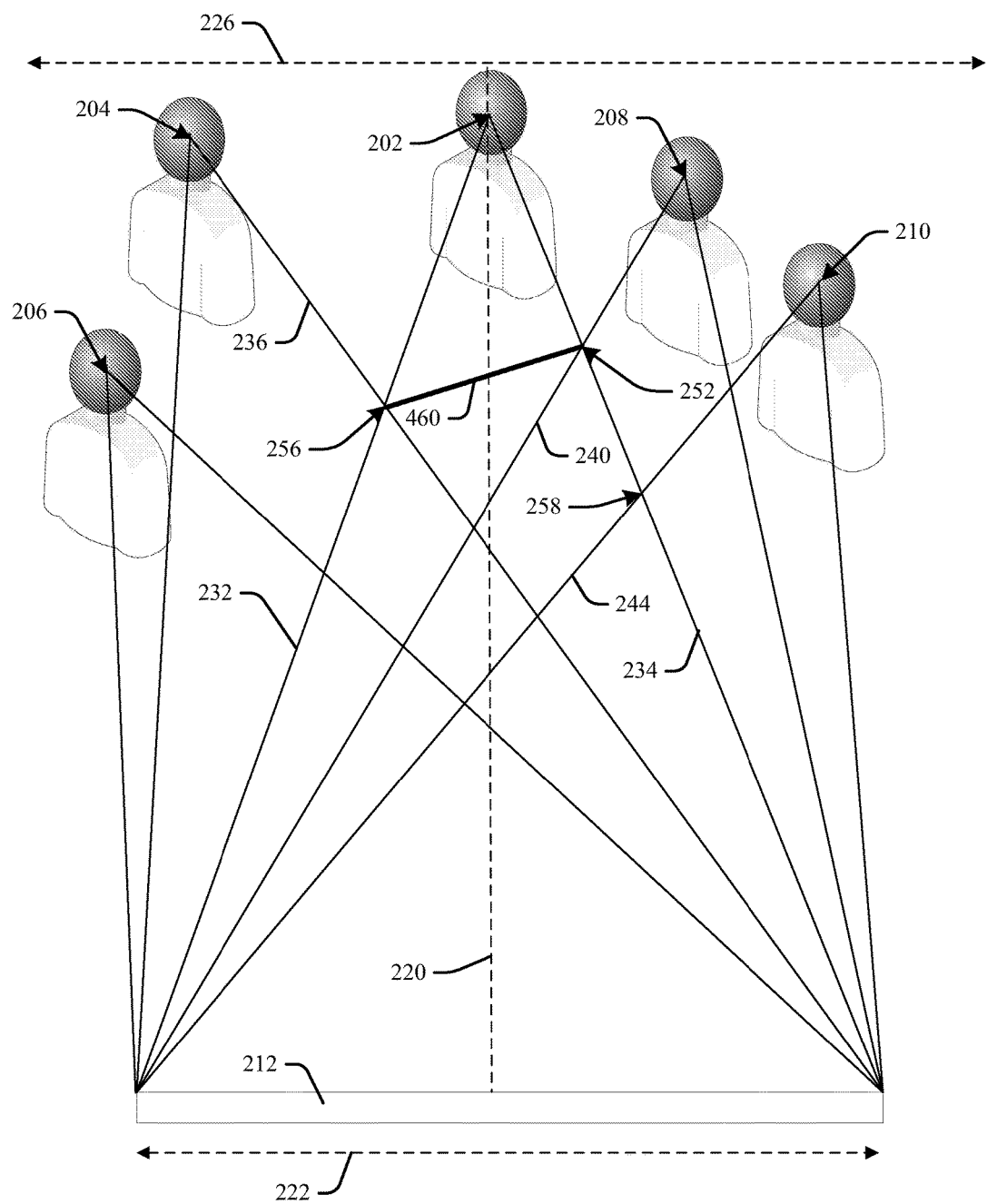
FIG. 6 a block diagram illustration of an alternative embodiment of the present invention.

FIG. 6 is a flow chart illustration of an alternative embodiment of the present invention, wherein a processor configured according to the present invention (the "configured processor") defines (solves, identifies, etc.) the masking screen width dimension and for the protected viewer 302 (at 106, FIG. 4) as a line 460 connecting the closest intersection points determined on each of the respective outer boundary lines 232 and 234 of the horizontal angle of view 202 of the protected viewer 302: thus from intersection point 252 on outer boundary line 234 to intersection point 256 on outer boundary line 232. In contrast to the embodiment 260 of FIG. 5, parallel orientation of the horizontal mask dimension 460 relative to the display screen 212 is not required. By requiring that the dimension line 460 extend between the closest intersection points 252 and 256 the configured processor ensures that it does locate the line 460 within any other one of the horizontal viewing angles 204, 206, 208 and 210 of each of the other viewers 304, 306, 308 and 310 (since, there is no intervening intersection with any of their respective outer boundary lines between the protected viewer 302 and the closest horizontal viewing angle overlap intersections 252 and 256).

Comparison of the different respective masking screen width dimensions 260 and 460 determined for the protected viewer pursuant to the different embodiments of FIGS. 5 and 6 show differences is size and location, each of which may be advantageous in projecting the masking screen. Thus, the smaller overall width and parallel orientation of the dimension 260 may provide for efficiencies in generating the mask and displaying alternative content thereon, and simply projector placement, relative to dimension/location 460. In contrast, the larger dimension/location 460 may provide more comprehensive and effective screening effects relative to the view of the protected viewer.

Thus, as described above, aspects of the present invention enable to the projection of masking screens having width dimensions tailored to fit the viewing angles of children and other protected viewers, while enabling other viewers unobstructed views of objectionable content blocked from the view of the protected viewers by the masking elements. This enables children to watch movies in theater or home with other family members, wherein the masking elements enable the presentation of only child-friendly content, such as in substituted presentations upon the masking screens (within the view of the child) while the objectionable content is displayed on a main screen that is still visible to the other (adult) family members.

As will be appreciated by one skilled in the art, aspects may identify scenes not suited for kids by a variety of means, including rating tags visible on the screen or content ratings metadata communicated to aspects directly from the multimedia content during the duration of the objectionable content. Masking screen projections may be triggered in response to correlating the age of the protected viewer with a variety of different standards: for example, triggering the mask projection for presentation of a portion of content rated as "PG-13" content in response to determining that the age of the protected child viewer is less than 13, but not for children at or over the age of 13.

During the presentation of portions of objectional video, aspects project (or cause other devices to project) masking screens that function as projection screens in front of a child having dimensions that are just sufficient to cover the child's vision, and upon which alternative content (video, etc.) may be projected, to replace the objectionable content and thereby transform the multimedia content, for example, a showing story in child-friendly manner. Aspects may also create ultrasonic holographic objects around the ears of a protected viewer, to thereby shield externally broadcast audio from the viewer's ear and play alternative audio, for example locally providing alternative narration content within the ultrasonic holographic objects and thereby conveying a different story to a child, transform a production in a child-friendly manner.

At the conclusion of the objectionable content portion, and thereby upon return to all-ages or otherwise family-friendly content, aspects may automatically terminate projection of the masking screens and audio shielding objects, wherein the protected viewer again joins the other viewers in sharing consumption of the multimedia presentation, continuing to enjoy a movie with their parents and siblings, etc., and wherein the parent need not take any positive action in generating the masking screens and objects.

Aspects may use a variety of techniques to generate or project the masking screen as described above. In one embodiment small screen projection devices are installed in a seat-back of a seat that is located immediately in front of the seat of a protected viewer in a movie theater or other assembly facility (or in a railing or other structural element in the case of a front row seat that does not have a seat-back located in front of the protected viewer's seat), wherein the small screen projection device deploys a physical screen surface, or projects a holographic screen element, into the determined masking screen dimensions and location for screening of objectionable content from the protected viewer. The projected screen may be present at all times during presentment of the multimedia content, such as a translucent masking element that allows the protected viewer to view display screen content through the masking element until determining occurrence of objectionable content portions, wherein masking properties are activated and the masking element becomes opaque, and may present projections or displays of alternative visual content to the protected viewer. Alternatively, deployment of physical or holographic projection masking elements may be limited to durations of the objectionable content.

Some aspects project holographic masking elements into the determined masking element location and spanning the determined masking element dimensions projection, in order to occlude or hide the objectionable content from the view of the protected viewer. A wide variety of appropriate techniques for projecting holographic masking elements will be apparent to one skilled in the art. Some device aspects generate holographic masking projections by using time-reversal mirror and Rayleigh integral mechanisms. For example, aspect devices may direct ultrasonic beams consisting of long tone bursts at a target object, measure a resulting acoustic field at a large number of points surrounding the object, and utilize a positioning system to scan a small broadband hydrophone across a grid of measurement points in a single surface near the target. Object reconstruction may then be accomplished by back-propagating an acoustic field from measurement locations to a three-dimensional (3D) region representing the object. Accuracy tolerances and optimal parameters may be determined by modeling forward and backward propagation from a point scatterer. In one study that considered a set of 3-mm diameter plastic beads, ultrasound frequencies from one to 1.5 megahertz (MHz) were utilized in the collection of hologram measurements having grid spacings between 0.3 and 0.4 mm.

One skilled in the art will appreciate that the spatial resolution of 3D ultrasonic holography may be limited by diffraction effects. However, the results generated from discrete scatterers larger than a wavelength are generally well-resolved. Using 3D ultrasonic holography processes aspects may reconstruct the position and shape of objects or collections of objects that do not involve a significant amount of multiple scattering. Because spatial resolution has a typical diffraction limit on the order of a wavelength, improved spatial resolution can be achieved with higher frequencies. Aspects may be equipped with precise projector units to project child-friendly video in an appropriate dimension of the holographic screen, and external noise reduction techniques may be deployed to supplant objectionable audio content while the visual mask elements occlude the view of the objectional visual content by the protected viewer, while other (adult, etc.) viewers are afforded unobstructed views of the actual video played on the display screen, while they can also clearly hear the accompanying audio content broadcast to said viewers.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for the generation of a masking screen with spatial location and size dimensions selected to avoid obstructing the viewpoint of other viewers, the method comprising executing on a computer processor:
determining horizontal viewing angles for each of a plurality of viewers of a display screen as a function of outer edge visual boundary lines projecting from left and right outer edges of the display screen to different respective viewing locations of the viewers;
determining locations of intersections of the outer edge visual boundary lines that define the horizontal viewing angle of a first viewer of the plurality of viewers with the outer edge visual boundary lines defining the horizontal viewing angles of others of the plurality of viewers;
determining a masking screen width dimension and spatial location for the first viewer as a line that extends from a first of the determined intersection locations that is located on one of the outer edge visual boundary lines defining the viewing angle of the first viewer and is closest to the first viewer with respect to all others of the determined intersection locations, to a point on a remaining other of the outer edge visual boundary lines defining the viewing angle of the first viewer that is outside of the viewing angles of any remaining others of the plurality of viewers; and
in response to determining that a portion of a multimedia content displayed on the display screen to the plurality of viewers contains objectionable content relative to the first viewer, projecting a masking screen within the horizontal viewing angle of the protected viewer at the determined spatial location and having the determined width dimension for a duration of a presentment of the objectionable content portion of the multimedia content on the display screen, the projected masking screen thereby obscuring a view of the protected viewer of the objectionable content without obscuring views of remaining others of the plurality of viewers of the objectionable content.

2. The method of claim 1, further comprising:
in response to determining that the point on the remaining other of the outer edge visual boundary lines of the viewing angle of the first viewer is located within a vertical distance to a one of the intersection locations determined on the remaining other of the outer edge visual boundary lines defining the viewing angle of the first viewer that is closest to the first viewer with respect to the viewing distance of the first viewer to the display screen, determining the masking screen width dimension and spatial location for the first viewer by extending a line from the first intersection location in a direction that is parallel to the two-dimensional display screen to said point on the remaining other of the outer edge visual boundary lines defining the viewing angle of the first viewer.

3. The method of claim 1, further comprising:
in response to determining that the point on the remaining other of the outer edge visual boundary lines defining the viewing angle of the first viewer is a one of the intersection locations determined on the remaining other of the outer edge visual boundary lines defining the viewing angle of the first viewer that is closest to the first viewer with respect to the viewing distance of the first viewer to the display screen, determining the masking screen width dimension and spatial location for the first viewer by as a line connecting the first intersection location to said point on the remaining other of the outer edge visual boundary lines defining the viewing angle of the first viewer.

4. The method of claim 1, further comprising:
determining a height dimension of the masking screen to comprehend a vertical viewing angle of the first person of the display screen as defined by upper and lower edge visual boundary planes projecting from different corresponding upper and lower outer edges of the display screen to a vertical viewing location of the first viewer that is defined relative to the location of the first viewer; and
projecting the masking screen at the determined height dimension within the vertical viewing angle of the first viewer at the determined spatial location for the duration of presentment of the objectionable content portion of the multimedia content displayed on the display screen.

5. The method of claim 1, further comprising:
determining the duration of presentment of the objectionable content portion as a function of processing rating information conveyed during the duration of the presentment of the objectionable content portion that is selected from the group consisting of rating tags discernible within the multimedia content during the objectionable content portion and content ratings metadata within the multimedia content.

6. The method of claim 5, further comprising:
projecting the masking screen in response to determining a correlation of an age of the first viewer with the processed rating information.

7. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the determining the horizontal viewing angles for each of the plurality of viewers of the display, the determining the locations of the intersections of the outer edge visual boundary lines, the determining the masking screen width dimension and spatial location, and the projecting the masking screen.

8. The method of claim 7, wherein the computer-readable program code is provided as a service in a cloud environment.

9. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
determines horizontal viewing angles for each of a plurality of viewers of a display screen as a function of outer edge visual boundary lines projecting from left and right outer edges of the display screen to different respective viewing locations of the viewers;

determines locations of intersections of the outer edge visual boundary lines that define the horizontal viewing angle of a first viewer of the plurality of viewers with the outer edge visual boundary lines defining the horizontal viewing angles of others of the plurality of viewers;

determines a masking screen width dimension and spatial location for the first viewer as a line that extends from a first of the determined intersection locations that is located on one of the outer edge visual boundary lines defining the viewing angle of the first viewer and is closest to the first viewer with respect to all others of the determined intersection locations, to a point on a remaining other of the outer edge visual boundary lines defining the viewing angle of the first viewer that is outside of the viewing angles of any remaining others of the plurality of viewers; and in response to determining that a portion of a multimedia content displayed on the display screen to the plurality of viewers contains objectionable content relative to the first viewer, projects a masking screen within the horizontal viewing angle of the protected viewer at the determined spatial location and having the determined width dimension for a duration of a presentment of the objectionable content portion of the multimedia content on the display screen, the projected masking screen thereby obscuring a view of the protected viewer of the objectionable content without obscuring views of remaining others of the plurality of viewers of the objectionable content.

10. The system of claim 9, wherein the processor executes the program instructions stored on the computer-readable storage medium via the computer readable memory and thereby:

in response to determining that the point on the remaining other of the outer edge visual boundary lines defining the viewing angle of the first viewer is located within a vertical distance to a one of the intersection locations determined on the remaining other of the outer edge visual boundary lines of the viewing angle of the first viewer that is closest to the first viewer with respect to the viewing distance of the first viewer to the display screen, determines the masking screen width dimension and spatial location for the first viewer by extending a line from the first intersection location in a direction that is parallel to the two-dimensional display screen to said point on the remaining other of the outer edge visual boundary lines defining the viewing angle of the first viewer.

11. The system of claim 9, wherein the processor executes the program instructions stored on the computer-readable storage medium via the computer readable memory and thereby:

in response to determining that the point on the remaining other of the outer edge visual boundary lines defining the viewing angle of the first viewer is a one of the intersection locations determined on the remaining other of the outer edge visual boundary lines defining the viewing angle of the first viewer that is closest to the first viewer with respect to the viewing distance of the first viewer to the display screen, determines the masking screen width dimension and spatial location for the first viewer by as a line connecting the first intersection location to said point on the remaining other of the outer edge visual boundary lines of the viewing angle of the first viewer.

12. The system of claim 9, wherein the processor executes the program instructions stored on the computer-readable storage medium via the computer readable memory and thereby:

determines a height dimension of the masking screen to comprehend a vertical viewing angle of the first person of the display screen as defined by an upper and lower edge visual boundary planes projecting from different corresponding upper and lower outer edges of the display screen to a vertical viewing location of the first viewer that is defined relative to the location of the first viewer; and projects the masking screen at the determined height dimension within the vertical viewing angle of the first viewer at the determined spatial location for the duration of presentment of the objectionable content portion of the multimedia content displayed on the display screen.

13. The system of claim 9, wherein the processor executes the program instructions stored on the computer-readable storage medium via the computer readable memory and thereby:

determines the duration of presentment of the objectionable content portion as function of processing rating information conveyed during the duration of the presentment of the objectionable content portion that is selected from the group consisting of rating tags discernible within the multimedia content during the objectionable content portion and content ratings metadata within the multimedia content.

14. The system of claim 13, wherein the processor executes the program instructions stored on the computer-readable storage medium via the computer readable memory and thereby:

projects the masking screen in response to determining a correlation of an age of the first viewer with the processed rating information.

15. A computer program product for the generation of a masking screen with spatial location and size dimensions selected to avoid obstructing the viewpoint of other viewers, the computer program product comprising:

a computer readable storage medium having computer readable program code embodied therewith, wherein the computer readable storage medium is not a transitory signal per se, the computer readable program code comprising instructions for execution by a processor that cause the processor to:

determine horizontal viewing angles for each of a plurality of viewers of a display screen as a function of outer edge visual boundary lines projecting from left and right outer edges of the display screen to different respective viewing locations of the viewers;

determine locations of intersections of the outer edge visual boundary lines that define the horizontal viewing angle of a first viewer of the plurality of viewers with the outer edge visual boundary lines defining the horizontal viewing angles of others of the plurality of viewers;

determine a masking screen width dimension and spatial location for the first viewer as a line that extends from a first of the determined intersection locations that is located on one of the outer edge visual boundary lines defining the viewing angle of the first viewer and is closest to the first viewer with respect to all others of the determined intersection locations, to a point on a remaining other of the outer edge visual boundary lines defining the viewing angle of the first viewer that is outside of the viewing angles of any remaining others of the plurality of viewers; and in response to determining that a portion of a multimedia content displayed on the display screen to the plurality of viewers contains objectionable content relative to the first viewer, project a masking screen within the horizontal viewing angle of the protected viewer at the determined spatial location and having the determined width dimension for a duration of a presentment of the objectionable content portion of the multimedia content on the display screen, the projected masking screen thereby obscuring a view of the protected viewer of the objectionable content without obscuring views of remaining others of the plurality of viewers of the objectionable content.

16. The computer program product of claim 15, wherein the computer readable program code instructions for execution by the processor further cause the processor to:

in response to determining that the point on the remaining other of the outer edge visual boundary lines defining the viewing angle of the first viewer is located within a vertical distance to a one of the intersection locations determined on the remaining other of the outer edge visual boundary lines of the viewing angle of the first viewer that is closest to the first viewer with respect to the viewing distance of the first viewer to the display screen, determine the masking screen width dimension and spatial location for the first viewer by extending a line from the first intersection location in a direction that is parallel to the two-dimensional display screen to said point on the remaining other of the outer edge visual boundary lines defining the viewing angle of the first viewer.

17. The computer program product of claim 15, wherein the computer readable program code instructions for execution by the processor further cause the processor to:

in response to determining that the point on the remaining other of the outer edge visual boundary lines defining the viewing angle of the first viewer is a one of the intersection locations determined on the remaining other of the outer edge visual boundary lines defining the viewing angle of the first viewer that is closest to the first viewer with respect to the viewing distance of the first viewer to the display screen, determine the masking screen width dimension and spatial location for the first viewer by as a line connecting the first intersection location to said point on the remaining other of the outer edge visual boundary lines of the viewing angle of the first viewer.

18. The computer program product of claim 15, wherein the computer readable program code instructions for execution by the processor further cause the processor to:

determine a height dimension of the masking screen to comprehend a vertical viewing angle of the first person of the display screen as defined by an upper and lower edge visual boundary planes projecting from different corresponding upper and lower outer edges of the display screen to a vertical viewing location of the first viewer that is defined relative to the location of the first viewer; and project the masking screen at the determined height dimension within the vertical viewing angle of the first viewer at the determined spatial location for the duration of presentment of the objectionable content portion of the multimedia content displayed on the display screen.

19. The computer program product of claim 15, wherein the computer readable program code instructions for execution by the processor further cause the processor to:

determine the duration of presentment of the objectionable content portion as function of processing rating information conveyed during the duration of the presentment of the objectionable content portion that is selected from the group consisting of rating tags discernible within the multimedia content during the objectionable content portion and content ratings metadata within the multimedia content.

20. The computer program product of claim 19, wherein the computer readable program code instructions for execution by the processor further cause the processor to:

project the masking screen in response to determining a correlation of an age of the first viewer with the processed rating information.

* * * * *